No. 641,445. Patented Jan. 16, 1900.
A. M. FERGUSON & K. P. SHEDD.
BICYCLE WHEEL TIRE.
(Application filed Jan. 20, 1899.)

(No Model.)

Witnesses
Thos. D. McClary
E. B. Wren

Inventors
A. M. Ferguson
K. P. Shedd,
By H. N. Jenkins,
Attorney

UNITED STATES PATENT OFFICE.

ALBERT M. FERGUSON AND KENDRICK P. SHEDD, OF ROCHESTER, NEW YORK; SAID SHEDD ASSIGNOR TO THE ROCHESTER NON-PUNCTURABLE TIRE COMPANY, OF SAME PLACE.

BICYCLE-WHEEL TIRE.

SPECIFICATION forming part of Letters Patent No. 641,445, dated January 16, 1900.

Application filed January 20, 1899. Serial No. 702,817. (No model.)

*To all whom it may concern:*

Be it known that we, ALBERT M. FERGUSON and KENDRICK P. SHEDD, citizens of the United States, residing at Rochester, in the county of Monroe and State of New York, have invented new and useful Improvements in Bicycle-Wheel Tires, of which the following is a specification.

This invention relates to improvements in pneumatic tires, such as are used for bicycle and other wheels; and it consists in providing same with a non-puncturable annular shield, the said shield consisting of a series of concavo-convex metallic plates, an inner and an outer annular elastic cover of greater width than the plates, and rivets whereby each plate is centrally secured to the two covers.

The invention further consists in certain details of construction, as hereinafter fully described and specifically claimed.

Our improvements are clearly shown in the accompanying drawings, whereon—

Figure 1:
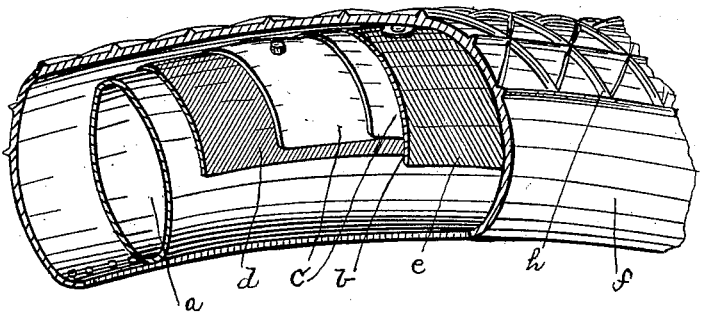
Figure 2:
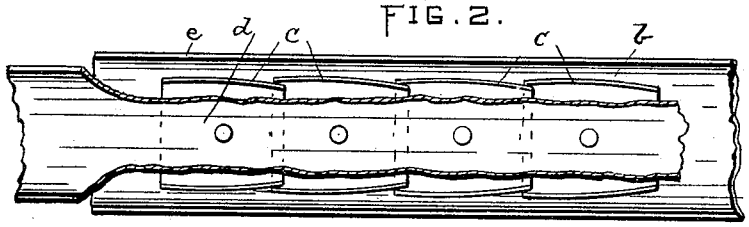
Figure 3:
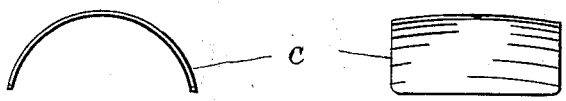
Figure 4:

Figure 1 is a perspective view of a section of a pneumatic tire provided with our improvement. Fig. 2 represents an inside view of our improved shield, parts of the inner annular cover being broken away in order to show the interjacent concavo-convex plates. Fig. 3 is an end view of one of the said plates, and Fig. 4 is a side view of same.

Referring to the drawings, the letter *a* designates the inflatable inner tube, and *b* a section of the non-puncturable shield or protector thereof. The said shield is composed of a series of concavo-convex steel plates *c*, which are arranged to lap one another and which are thus held by being riveted to inner and outer annular strips of rubber or other elastic material, as indicated at *d e*. The whole is inclosed within an annular rubber or elastic shoe *f*, the tread of which is preferably provided with raised ribs *h h'*, arranged in parallel or diagonal lines, so as to insure a better hold on the surface over which the wheel is propelled. This shoe is designed to be laced at its back or inner side and to rest in the ordinary concave rim of the wheel.

From the foregoing description it will be seen that the construction of our shield is such that it not only protects the tire from puncture, but saves the shoe or outer covering and the tire from being cut or otherwise injured by the scales or concavo-convex plates of which the shield is partly composed.

The resiliency of the wheel is in no way impaired by our shield, inasmuch as the said shield has no direct connection either with the tire or shoe.

Having described our invention, what we claim as new, and desire to secure by Letters Patent, is—

1. As a new article of manufacture, a shield for pneumatic tires, said shield comprising a series of overlapping concavo-convex metal plates, an inner and an outer elastic cover of greater width than the plates and rivets whereby each plate is centrally secured between the two elastic covers, as and for the purpose described.

2. In combination with a pneumatic tire, a shield composed of a series of overlapping concavo-convex plates, an inner and an outer elastic cover of greater width than the plates, rivets whereby the plates and covers are secured together, as described, and a shoe, or outer cover of elastic material, substantially as set forth.

In testimony whereof we have hereunto set our hands this 2d day of August, A. D. 1898.

ALBERT M. FERGUSON.
KENDRICK P. SHEDD.

Witnesses:
WM. A. FOX,
THOMAS L. PIERSON.